US012640001B2

(12) United States Patent
Jin et al.

(10) Patent No.: US 12,640,001 B2
(45) Date of Patent: May 26, 2026

(54) VERTICAL ASSET MANAGEMENT DEVICE

(71) Applicant: SIGNIFI SOLUTIONS INC., Mississauga (CA)

(72) Inventors: Yong Suk Jin, Oakville (CA); Kris Dutkiewicz, Barrie (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 86 days.

(21) Appl. No.: 18/386,452

(22) Filed: Nov. 2, 2023

(65) Prior Publication Data

US 2024/0153335 A1 May 9, 2024

Related U.S. Application Data

(60) Provisional application No. 63/382,150, filed on Nov. 3, 2022.

(51) Int. Cl.
*G07F 11/52* (2006.01)
*G07F 9/02* (2006.01)

(52) U.S. Cl.
CPC .............. *G07F 11/52* (2013.01); *G07F 9/026* (2013.01)

(58) Field of Classification Search
CPC ........ G07F 11/00; G07F 11/52; A47B 49/002; A47F 3/002
USPC ......... 312/97.1, 117, 139.2, 291, 292, 293.1, 312/293.3; 211/1.51, 1.52, 121; 221/12, 221/91; 160/215; 49/3, 142, 168
See application file for complete search history.

(56) References Cited

U.S. PATENT DOCUMENTS 4,130,326 A * 12/1978 Hornblad ................ A47F 3/002 312/42
5,820,237 A * 10/1998 Robey .................. A47B 49/002 312/139.2

(Continued)

FOREIGN PATENT DOCUMENTS

GB 2348233 A * 9/2000 .............. E06B 9/115

OTHER PUBLICATIONS

Vidir Solutions, "Bopos/Bopis Carousel", vidirsolutions.com, date unknown, Retrieved from the Internet on Jul. 8, 2024 from URL: https://vidirsolutions.com/products/bopos-bopis-carousel.

(Continued)

*Primary Examiner* — Daniel J Troy
*Assistant Examiner* — Elizabeth Irene Artalejo
(74) *Attorney, Agent, or Firm* — Perry + Currier Inc.

(57) ABSTRACT

An example asset management device includes an enclosure having an aperture extending across a front plate of the enclosure; a plurality of shelving units; a vertical carousel disposed within the enclosure to support the plurality of shelving units, the vertical carousel having at least one horizontal axis of rotation and configured to rotate about the at least one horizontal axis of rotation to move the shelving units vertically within the enclosure until a selected shelving unit is aligned with the aperture; a door unit removably secured in the aperture, the door unit comprising: a locking element configured to secure the door unit in the aperture; a plurality of doors, each door configured to move between an open position to allow access through a portion of the aperture to a corresponding region of the selected shelving unit and a closed position configured to restrict access through the portion of the aperture.

7 Claims, 8 Drawing Sheets

(56) References Cited

U.S. PATENT DOCUMENTS

| | | | | |
|---|---|---|---|---|
| 8,252,232 | B2 | 8/2012 | Neeper et al. | |
| 8,616,381 | B1 | 12/2013 | Forster et al. | |
| 11,175,298 | B2 | 11/2021 | Neeper et al. | |
| 11,583,075 | B2 * | 2/2023 | Bianco | B65G 1/02 |
| 11,875,628 | B2 * | 1/2024 | Gonzalez | G07F 11/42 |
| 2019/0111955 | A1 * | 4/2019 | Canoso | B60L 50/60 |

OTHER PUBLICATIONS

Vidir Solutions, "Automated Lockers", vidirsolutions.com, date unknown, Retrieved from the Internet on Jul. 8, 2024 from URL: https://vidirsolutions.com/products/automated-lockers.

Modula, "Modula Vertical Storage Solutions—Vertical lift modules", modula.us, 2024, Retrieved from the Internet on Sep. 4, 2024 from URL: https://modula.us/storage-solutions/vertical-lift-modules/.

* cited by examiner

VERTICAL ASSET MANAGEMENT DEVICE

CROSS REFERENCE TO RELATED APPLICATIONS

This application claims priority from U.S. Application No. 63/382,150 filed on Nov. 3, 2022, the contents of which are incorporated herein by reference.

FIELD

The specification relates generally to shelving systems, and more particularly to vertical shelving systems.

BACKGROUND

Vertical shelving systems are used from document management to inventory management. The vertical shelving systems were developed to better utilize vertical space. Vertical shelving systems can save footprints as well as efficiently store items under limited space. The vertical shelving systems commonly include vertical lifters and vertical carousels. The vertical litters move 3-dimensionally whereas the vertical carousels move 1-dimensionally. The vertical carousels generally have smaller footprints than the vertical lifters due to the limited one-dimensional movement. On the other hand, the vertical carousels have limitations to dispensing smaller items securely.

SUMMARY

According to an aspect of the present specification an example asset management device includes: an enclosure having an aperture extending across a front plate of the enclosure; a plurality of shelving units; a vertical carousel disposed within the enclosure to support the plurality of shelving units, the vertical carousel having at least one horizontal axis of rotation and configured to rotate about the at least one horizontal axis of rotation to move the shelving units vertically within the enclosure until a selected shelving unit is aligned with the aperture; a door unit removably secured in the aperture, the door unit comprising: a locking element configured to secure the door unit in the aperture; a plurality of doors, each door configured to move between an open position to allow access through a portion of the aperture to a corresponding region of the selected shelving unit and a closed position configured to restrict access through the portion of the aperture.

According to another aspect of the present specification, an example method includes: receiving an access request to access the asset management device; determining a target shelf location based on the access request, the target shelf location including a selected shelving unit of a plurality of shelving units and a region of the selected shelving unit; controlling a vertical carousel supporting the plurality of shelving units to align the selected shelving unit with an aperture of the asset management device; identifying one or more doors corresponding to the region of the selected shelving unit; and enabling the one or more doors to move to an open position to allow access to the region of the selected shelving unit through a portion of the aperture corresponding to the one or more doors.

BRIEF DESCRIPTION OF DRAWINGS

Implementations are described with reference to the following figures, in which.

DETAILED DESCRIPTION

Asset management devices employing vertical shelving systems are versatile and may be employed in a variety of different situations. In particular, vertical shelving systems may make efficient use of vertical space. However, vertical shelving systems may be quite wide to reduce the number of mechanical motors and drivers required to drive the systems. Accordingly, the apertures to access shelving units are correspondingly wide. This may result in insecure storage of items.

Some systems use a plurality of hinged doors to selectively control access to portions of the aperture. However, hinged doors take up additional space when they swing open and additionally limit the capacity of the asset management devices based on the fixed width of the hinged doors. Further, the hinged doors are built into the systems for security, and accordingly, require high levels of customization of the entire asset management devices for different applications.

In accordance with the present disclosure, an asset management device includes a removably securable door unit including a plurality of doors. The door unit includes locking elements to secure the door unit in the aperture, while also allowing authorized replacement of the door unit for different door units with different door configurations according to the functional requirements of the particular deployment of the asset management device.

Further, the doors of the door unit are configured to allow for flexibility of the portion of the aperture which is made accessible. In particular, the doors may be configured to limit the accessible portion of the aperture along a width of the aperture, along a height of the aperture, or both. Further, the doors may be configured to be substantially modular or otherwise flexibly able to vary the width (or height) of the accessible portion of the aperture, for example by employing tambour-style doors which do not have a fixed width in the direction of opening, or modular sliding doors which allow multiple doors to be opened simultaneously to act as a single door.

Figure 1:
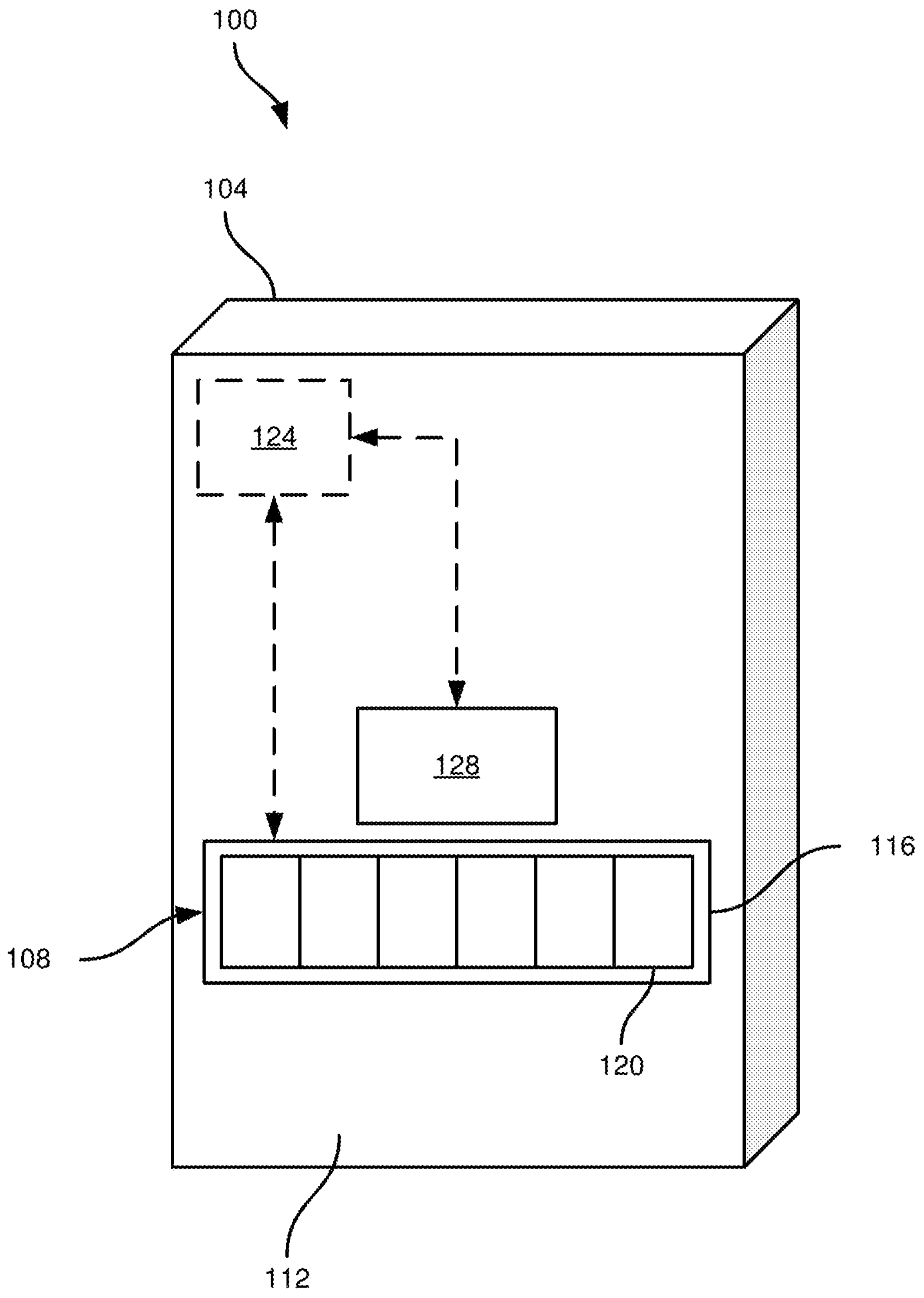
FIG. 1 depicts an example asset management device in accordance with the present disclosure.

FIG. 1 depicts an example asset management device 100 in accordance with the present disclosure. The asset management device 100 (also referred to herein as simply the device 100) is generally configured to house assets or items which may be dispensed to users. For example, the device 100 may be a type of vending machine to dispense items upon sale to the user. In other examples, the device 100 may be configured to dispense equipment or the like in a hospital, warehouse, office building, or other facility.

The device 100 includes an enclosure 104 in which the items are housed. The enclosure 104 includes an aperture 108 extending across a front plate 112 of the enclosure 104. The front plate 112 of the enclosure may preferably be substantially planar, and the enclosure 104 may further include side plates, top and bottom plates and a rear plate to substantially form a rectangular prism. The rear plate and/or side plates may include one or more access hatches (e.g., doors) for loading items to be delivered, for maintenance, or the like. In some examples, the top plate may additionally include one or more access hatches for loading items, for example via a drone or the like. In other examples, the enclosure 104 may be defined by other plates, structural elements and/or be substantially different in shape. Further, the enclosure 104 may include elevators, lifters, telescopic sliders, and the like, for loading bulky or heavy items. The enclosure 104 may additionally include solar panels at a top plate to power the device 100 for outdoor use.

The aperture 108 is generally configured to allow access to the interior of the enclosure, for example, by allowing a user to reach through the aperture 108 to retrieve or deliver an item on the interior side of the aperture 108. The aperture 108 may extend substantially across the front of the enclosure 104, for example to match a width of a shelving unit therein.

Figure 2:
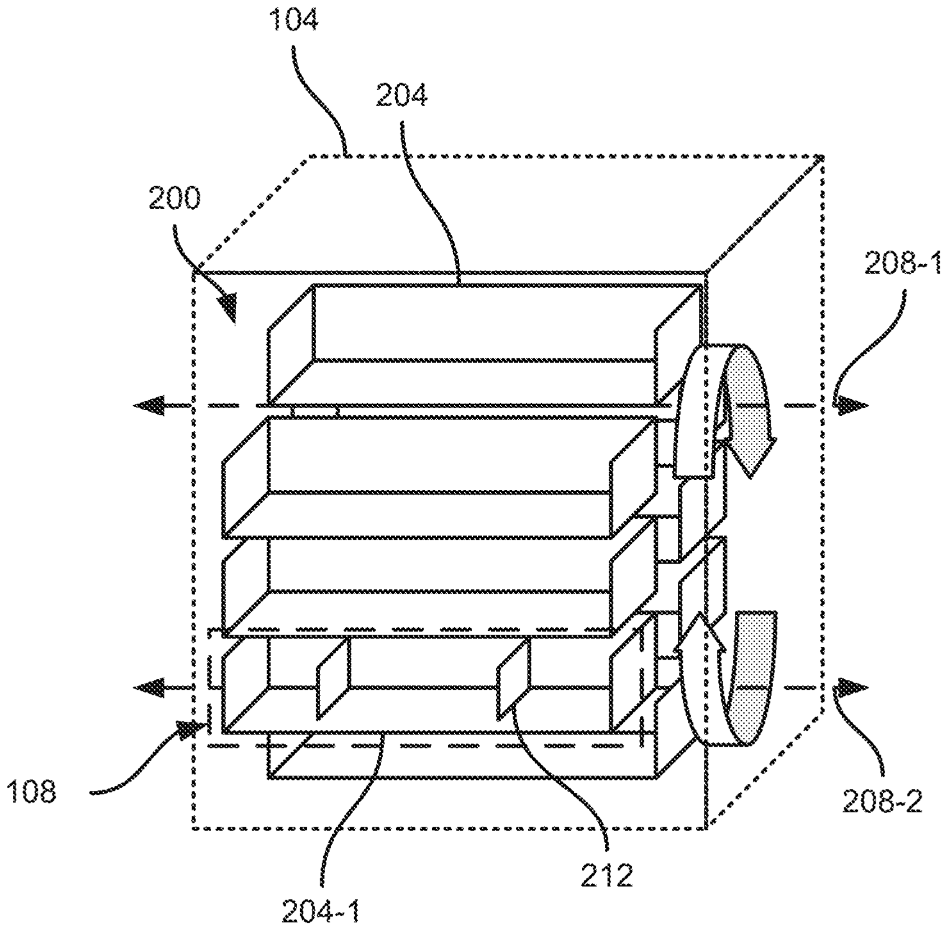
FIG. 2 depicts certain internal components of the asset management device of FIG. 1.

For example, referring to FIG. 2, a schematic diagram of certain interior components of the device 100 is depicted. The device 100 includes a carousel 200 supporting a plurality of shelving units 204, of which eight example shelving units are depicted (referred to herein generically as a shelving unit 204 and collectively as shelving units 204; this nomenclature is also used elsewhere herein). The carousel 200 includes at least one horizontal axis of rotation 208. In the present example, the carousel includes two horizontal axes of rotation 208-1 and 208-2 to allow the carousel to move the shelving units 204 vertically and in a loop within the enclosure 104. The carousel 200 may be driven by one or more motors, gears, belts, drive chains, tracks, shelf guides, combinations of the above and the like.

In operation, the carousel 200 is generally configured to move the shelving units 204 about the loop to align a selected shelving unit 204-1 with the aperture 108. The carousel 200 may be configured to move in a clockwise direction, a counterclockwise direction, or interchangeably based on the location of the selected shelving unit 204 in relation to the aperture 108. As the carousel 200 is configured to move the shelving units 204 vertically and not horizontally, relative to the aperture 108, the aperture 108 may preferably be about the width of each of the shelving units 204 to allow an operator to access any region of the selected shelving unit 204 which is aligned with the aperture 108.

However, the aperture 108 may not provide for security of items stored on the shelving units 204, particularly if multiple items smaller than the width of the shelving units 204 are stored on a single shelving unit 204. Accordingly, returning to FIG. 1, the device 100 further includes a door unit 116 secured in the aperture 108.

The door unit 116 includes a plurality of doors 120, of which six example doors 120 are depicted. Each of the doors 120 is configured to move between an open position and a closed position. In the open position, the door 120 allows access through a portion of the aperture 108 (i.e., a portion of the aperture 108 corresponding to a space between a free edge of the door 120 and an opposite edge on another door 120 or a frame of the door unit 116) to a corresponding region of the selected shelving unit 204. In the closed position, the door 120 restricts access through the portion of the aperture 108. Further, to maintain the doors 120 in the closed position, and to prevent unauthorized access, each door 120 may include one or more door locks, including, but not limited to, latches, bolts, magnets, solenoids, springs, and the like. That is, each door lock is configured to maintain the respective door 120 in the closed position when the door lock is engaged.

The doors 120 may be interconnected with a controller 124 of the device 100. The controller 124 may include a processor, a central processing unit (CPU), a microcontroller, a microprocessor, a processing core, a field-programmable gate array (FPGA), or similar. The controller 124 may include multiple cooperating processors. The controller 124 may cooperate with a memory, including a combination of volatile (e.g., Random Access Memory or RAM) and non-volatile memory (e.g., read-only memory or ROM, Electrically Erasable Programmable Read Only Memory or EEPROM, flash memory) to realize the functionality described herein. All or some of the memory may be integrated with the controller 124.

The memory stores applications, each including a plurality of computer-readable instructions executable by the controller 124; execution of the instructions configures the device 100 to perform the actions discussed herein. The application may be implemented as a suite of distinct applications, and some or all of the functionality of the application may be implemented as dedicated hardware components, such as one or more FPGAs or application-specific integrated circuits (ASICs).

Generally, the controller 124 is configured to manage access to the device 100, as will be described further herein. For example, the controller 124 may receive an access request via a user interface 128 of the device 100. In particular, the controller may control the carousel 200 to rotate as appropriate to align a selected shelving unit 204 with the aperture 108, as well as the doors 120 to move between the open position and the closed position as appropriate. Further, the door locks may preferably be controllable by the controller 124 (i.e., may be electronically controlled).

The user interface 128 may include a display, a touch screen, a payment device, an identification device, a keypad, a camera, and the like. For example, the user interface 128 may include both input and output devices. Additionally, the user interface 128 may include non-contact assistance, including one or more cameras, speakers, microphones, and the like for gesture or voice recognition.

In some examples, the device 100 may further include a communications interface (not shown), which may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the device 100 to communicate with other computing devices. The specific components of the communications interface are selected based on the types of communication links that the device 100 communicates over.

The door unit 116 may be removably secured in the aperture 108 by one or more locking elements to prevent unauthorized removal of the entire door unit 116, while also allowing the door unit 116 to be interchanged with other door units based on the deployment requirements for the device 100. The door unit 116 may additionally include one or more brackets or the like for maintaining the door unit 116 in the proper position in the aperture 108. For example, different door units 116 may have different configurations of the doors 120, including different sized doors 120, different opening mechanisms, and the like. Some example door units 116 are described in further detail below.

The device 100 may additionally include one or more features to facilitate the storage and/or dispensing operation of the device 100. For example, the door unit 116, the doors 120 and/or the aperture 108 may include one or more cameras and/or readers to identify items on the shelving units 204, light fixtures (e.g., light emitting diode (LED) lights, etc.) to illuminate the accessible region of the shelving unit 204, and the like.

Accordingly, referring again to FIG. 2, the shelving units 204 may include one or more separators 212 configured to separate the regions of the shelving units 204. In some examples, the doors 120 may limit the accessible portion of the aperture 108 along a width of the aperture 108. Accordingly, the separators 212 may be substantially vertical and spaced horizontally away from one another along the width of the shelving unit 204. The separators 212 may align with respective edges of each of the doors 120, or the separators 212 may be spaced according the item to be held on the shelving unit 204. For example, a wider item may be stored in two or more adjacent regions corresponding to two or more adjacent doors 120, and hence the shelving unit 204 may not include separators 212 between said two or more adjacent doors 120.

In other examples, the doors 120 may additionally limit the accessible portion of the aperture 108 along a height of the aperture 108. Accordingly, one or more of the separators 212 may be substantially horizontal and may further act as a support surface or a ceiling for a region of the shelving unit 204.

In some examples, the shelving units 204 may additionally include an aperture and optionally a door or hatch at a rear of each shelving unit 204 to allow items to be loaded onto the shelving unit 204 from, for example a rear access door of a rear plate of the enclosure 104. Further, the shelving units 204 may include temperature maintenance features, including air conditioners, other cooling mechanisms, insulators, and the like, to maintain the temperature of the shelving units 204 at a predetermined temperature. In some examples, the temperature maintenance features may be specific to a particular shelving unit, while in other examples, the features may be applied to the enclosure 104.

Figure 3A:
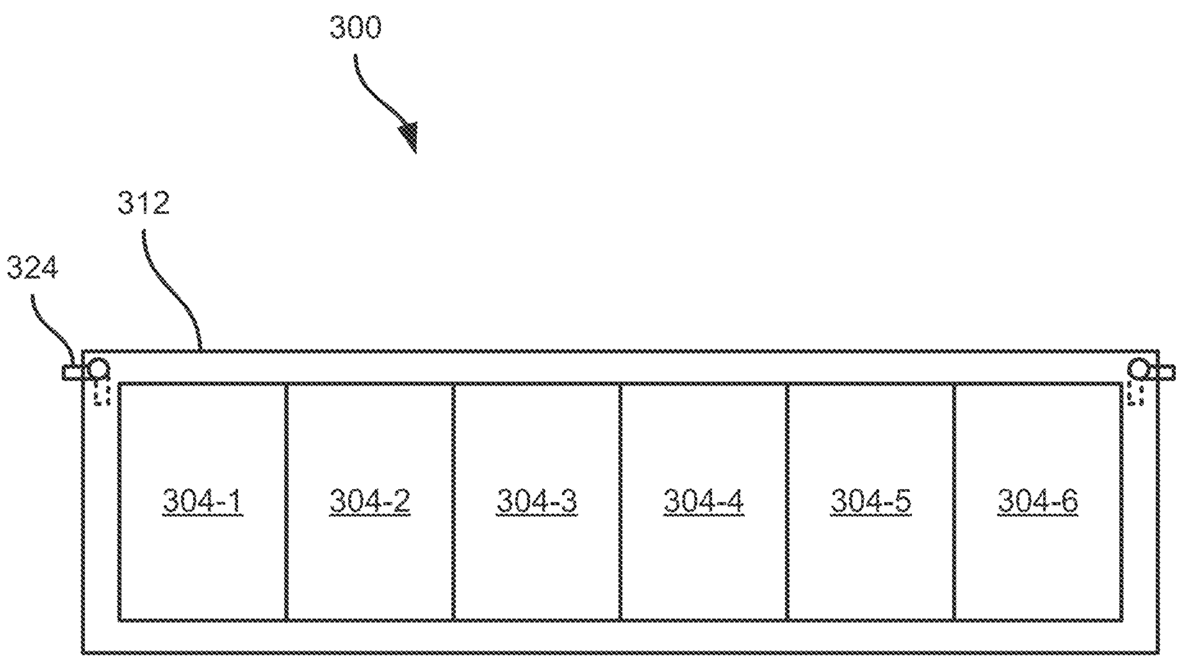
FIGS. 3A and 3B depict an example door unit with vertically sliding panel doors.
Figure 3B:
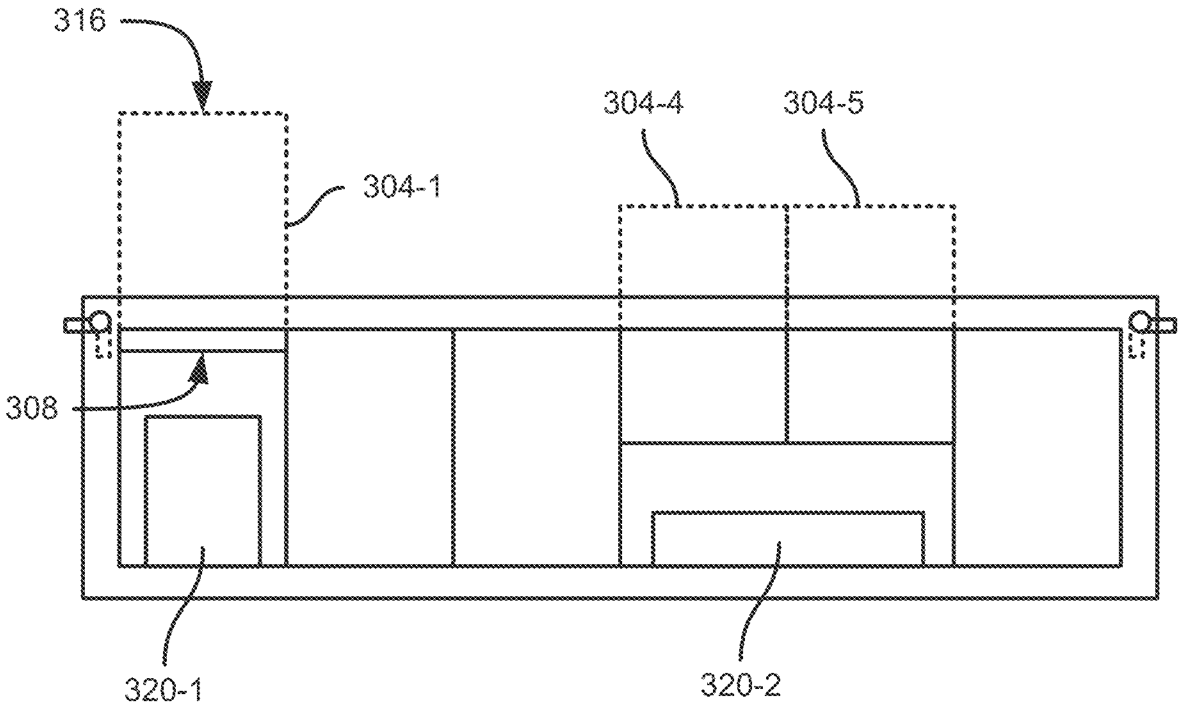

Turning now to FIG. 3A, an example door unit 300 is depicted. The door unit 300 includes a plurality of doors 304-1, 304-2, 304-3, 304-4, 304-5, and 304-6, which are each shown in the closed position. In FIG. 3B, the doors 304-1, 304-4 and 304-5 are shown in the open position, with the remainder of the doors 304 shown in dashed lines.

In particular, a free edge 308 of each door 304 is configured to move parallel to a plane of the front plate 112 of the enclosure 104. In particular, the free edge 308 moves away from a frame 312 of the door unit 300. Further, the doors 304 are composed of a single panel configured to slide vertically to move the doors 304 between the open position and the closed position. That is, an opposing edge 316 (i.e., opposite the free edge 308) of the door 304 is also configured to move parallel to the plane of the front plate 112 of the enclosure 104. In particular, the parallel movement of both the free edge 308 and the opposing edge 316 along the plane of the front plate 112 serves to conserve space required for the doors 304 to move between the closed position and the open position.

The door unit 300 may include one or more motors, linear actuators, gears, belts, tracks, pulleys, and the like to allow the doors 304 to move vertically. For example, the door unit 300 may include a motor fixture frame installed above the door unit and configured to support a plurality of motors. Each motor may draw its respective door 304 towards it to move the door 304 to the open position.

Each of the doors 304 has a predefined width, and accordingly, each door 304 limits the accessible portion of the aperture 108 along a width of the aperture 108. Preferably, the doors 304 may be configured to mate with each other, to allow each door 304 to slide along a respective adjacent door 304 rather than including portions of the frame 312 between each door 304. For example, the doors 304 may have a tongue on one side edge, and a complementary groove on the opposite side edge, to allow adjacent doors to be connected via a tongue-in-groove connection. In other examples, other connections are also contemplated between two adjacent doors 304. Accordingly, two adjacent doors, such as the doors 304-4 and 304-5 may be moved between the closed position and the open position simultaneously to act as a single door having a wider width, without restriction of a portion of the frame 312 between the portions of the aperture 108 corresponding to each of the doors 304-4 and 304-5 individually. In the present example, each of the doors 304 has the same predefined width, however in other examples, the doors 304 may have different widths relative to one another (e.g., 4 inches or 8 inches, etc.).

Thus, for example, the door 304-1 may allow access through a portion of the aperture 108 to allow placement or retrieval of an item 320-1, As the item 320-1 is smaller than a width of the door 304-1, the selected shelf unit 204 aligned with the aperture 108 may include a separator 212 substantially at an edge between the door 304-1 and the door 304-2. The doors 304-4 and 304-5 may operate simultaneously as effectively a single door to allow a wider item 320-2 to be stored on the shelf unit 204. Accordingly, the shelf unit 204 may include separators 212 aligned with an edge between the door 304-3 and the door 304-4 and an edge between the door 304-5 and the door 304-6.

Further, the doors 304 may be configured to open to a certain height, thereby limiting the accessible portion of the aperture 108 along a height of the aperture 108. For example, the door 304-1 is opened substantially along an entire height of the aperture 108 to allow access to the taller item 320-1. The doors 304-4 and 304-5 may be opened to about half a height of the aperture 108 if the item 320-2 is shorter. Accordingly, in some examples, the shelf unit 204 may further include a horizontal separator 212 to act as a ceiling or roof above the item 320-2.

The door unit 300 further includes locking elements 324 configured to secure the door unit 300 in the aperture 108. In the present example, two locking elements 324 are depicted; in other examples, more or fewer locking elements 324 may be included. In the present example, the locking elements 324 are configured to rotate between a secured position to secure the door unit 300 in the aperture 108 and an unsecured position. In other examples, other locking mechanisms are also contemplated. For example, the locking elements 324 may include one or more latches, magnets, switches, cams, screws, or the like, and may, in some examples, interface with corresponding receptors or other locking elements on the enclosure 104.

In particular, the locking elements 324 are configured to have an unsecured position in which the door unit 300 may be removed from the aperture 108, for example to replace the door unit 300 with a different door unit. Further, the locking elements 324 may preferably be designed with sufficient security to prevent unauthorized unlocking and removal of the door unit 300. For example, the locking elements 324 may be accessible only from an interior of the enclosure 104 (e.g., via secured rear or side access panels of the enclosure 104 or the like) and/or may only be moved to the unsecured position via a specialized key or other tool.

Figure 4A:
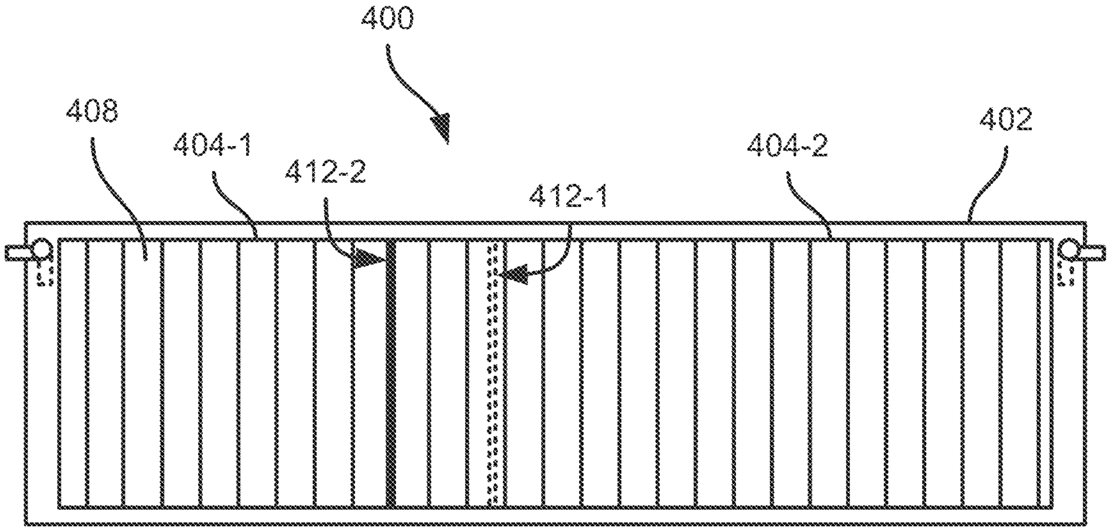
FIGS. 4A-4C depict an example door unit with tambour-style doors.
Figure 4B:
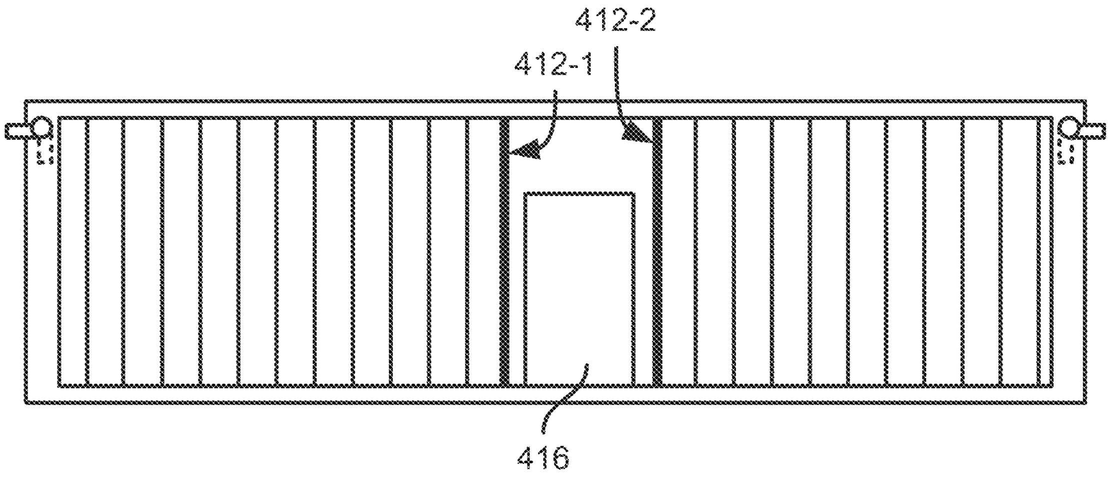

FIGS. 4A and 4B depict another example door unit 400, including two doors 404-1 and 404-2 supported in a frame 402 of the door unit 400. The doors 404 are tambour-style doors and include a plurality of tambour panels 408 interconnected with each other to allow the doors 404 to bend around corners and the like. For example, the tambour panels 408 may be connected via tongue-in-groove connections or other suitable types of connections to allow for flexibility in the doors 404 via rotation of the tambour panels 408 relative to one another. The frame 402 may serve to bridge the space between the doors 404 and the enclosure 104 to ensure that the aperture 108 is sealed.

The doors 404 also include respective free edges 412-1 and 412-2 configured to move parallel to a plane of the front plate 112. In particular, the free edges 412 move horizontally, parallel to the plane of the front plate 112. To move from the closed position depicted in FIG. 4A to the open position depicted in FIG. 4B, the tambour doors 404 are configured to move to a position in which one of the free edges 412 is aligned with a first side edge (e.g., a left edge) of the portion of the aperture 108 to be made accessible, and the other free edge 412 is moved to be aligned with a second side edge (e.g., a right edge) of the portion of the aperture 108 to be made accessible. That is, the open position of each of the doors 404 may be defined based on the position of the free edges 412 relative to one another. In other words, when the free edges 412 are spaced apart and the doors 404 are non-overlapping, then the doors 404 are in the open position. When the free edges 412 are adjacent or when the doors 404 overlap, then the doors 404 are in the closed position.

In particular, the doors 404 may limit the portion of the aperture 108 along a width of the aperture 108 to allow access to an item 416 on the shelf unit 204 aligned with the aperture 108. When tambour-style doors are employed, the width of the accessible portion of the aperture 108 may be finely tuned. Accordingly, the separators 212 of the shelving units 204 may be more flexibly spaced along a width of the shelving units 204, as the free edges 412 may be controlled to align with the separators 212, rather than the separators 212 being specifically placed to align with physical constraints of the doors.

Figure 4C:
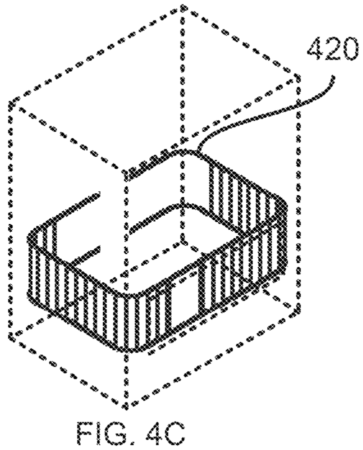

For example, the doors 404 may be situated on a track 420 extending substantially around the enclosure 104, as depicted in FIG. 4C (i.e., around an interior perimeter of the enclosure 104). In other examples, the track 420 may roll up or weave back and forth along the side plates of the enclosure 104. The doors 404 may be driven by one or more motors, drive belts, pulleys, and the like.

Figure 5A:
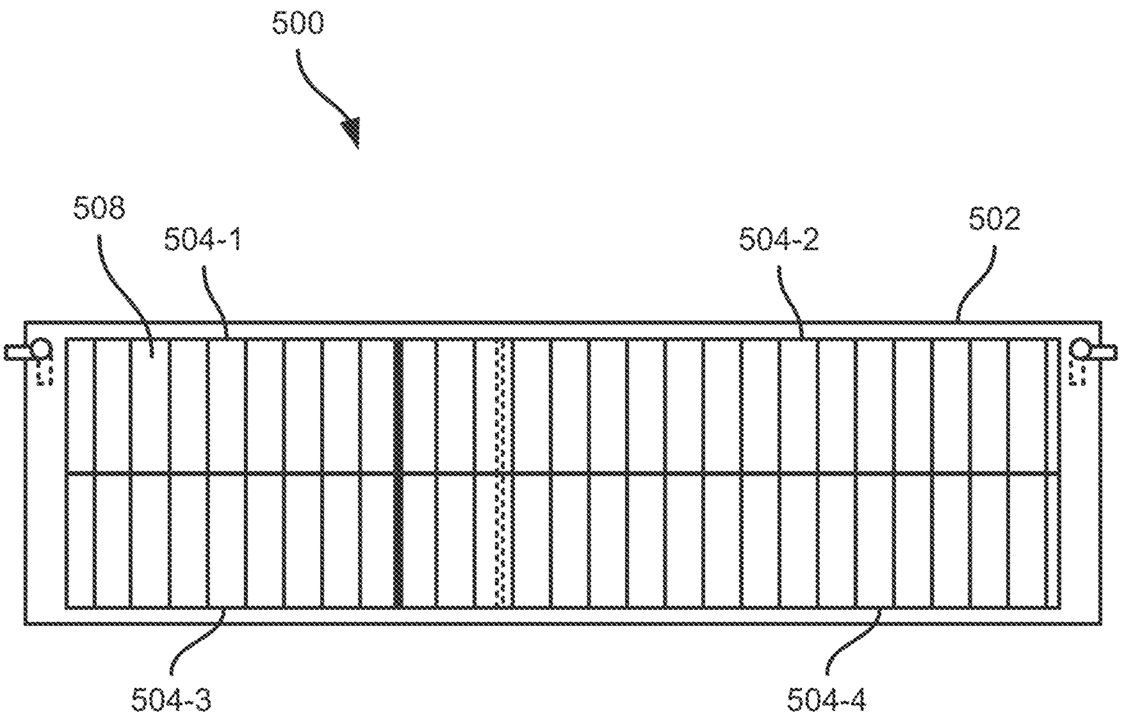
FIGS. 5A and 5B depict an example door unit with multi-level tambour-style doors.
Figure 5B:
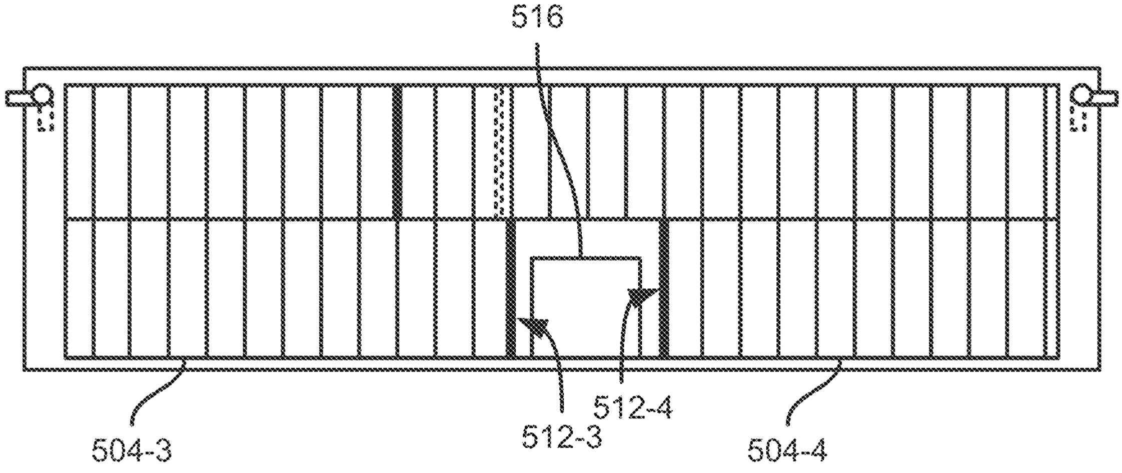

FIGS. 5A and 5B depict another example door unit 500, including four doors 504-1, 504-2, 504-3, and 504-4 supported in a frame 502. The doors 504 are similar to the doors 404 and are tambour-style doors and include a plurality of tambour panels 508 interconnected with each other. In particular, the doors 504 are paired and vertically stacked to be in a double-deck configuration. Each pair of doors 504 (i.e., the doors 504-1 and 504-2 as a first or upper pair and the doors 504-3 and 504-4 as a second or lower pair) ay sit on independent tracks and may move between the open positions and closed positions independently of one another.

The doors 504 may move relative to one another to define open positions which limit the accessible portion of the aperture 108 along the width of the aperture 108. Further, each pair of doors 504 limits the accessible portion of the aperture 108 along the height of the aperture 108 based on the height of each of the pairs of doors 504. Accordingly, as can be seen in FIG. 5B, the doors 504-1 and 504-2 may remain in the closed position while the doors 504-3 and 504-4 may be moved to the open position (i.e., defined relative to one another, with free edges 512-3 and 512-4 spaced away from one another), to allow access to an item 516 in a region of the shelving unit 204 which is aligned with the aperture 108.

To accommodate each level, the shelving units 204 may include a horizontal separator 212 configured to support items on an upper level corresponding to the upper pair of doors 504-1 and 504-2, as well as suitable vertical separators 212. As with the door unit 400, the doors 504 allow for fine-tuning of the width of the accessible portion of the aperture 108, and accordingly, the vertical separators 212 may be flexibly spaced along a width of the shelving units 204 based on the size of the items to be accommodated therein.

The doors 504 may similarly be situated on tracks (not shown) extending substantially an interior perimeter of the enclosure 104, and may be driven by one or more motors, drive belts, pulleys, and the like. In particular, each pair of doors 504 may be independently controlled and driven. In some examples, the frame 502 may extend between the pairs of the doors 504 (i.e., between the upper pair of the doors 504-1 and 504-2, and the lower pair of the doors 504-3 and 504-4) to seal any gaps therebetween.

Figure 6A:
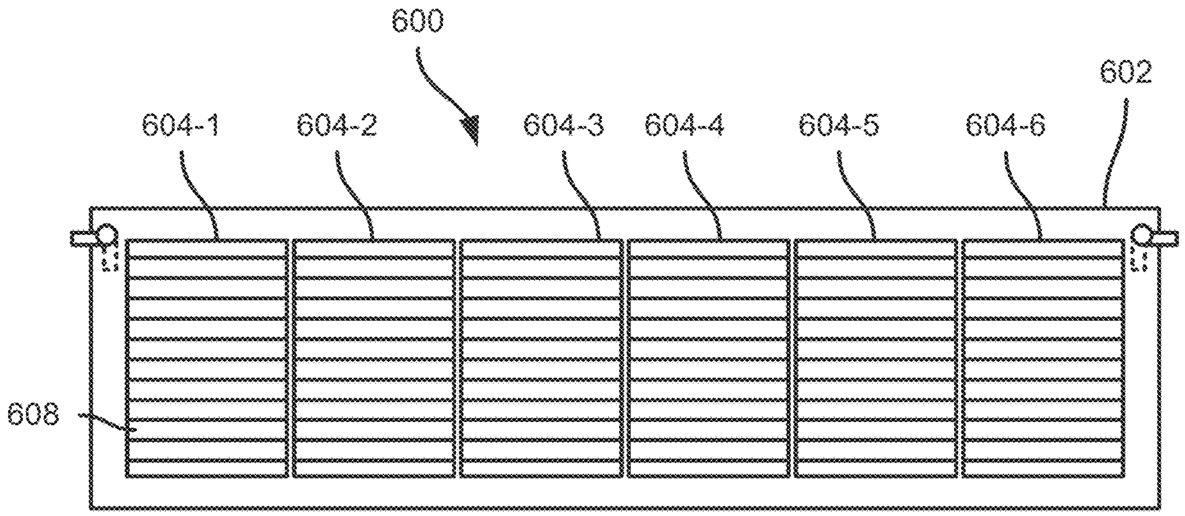
FIGS. 6A-6D depict an example door unit with vertical tambour-style doors.
Figure 6B:
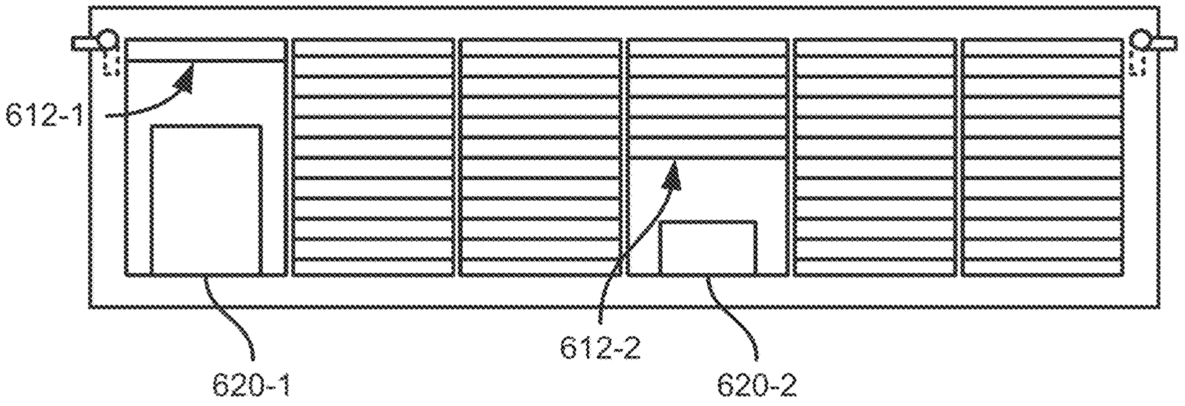
Figure 6C:
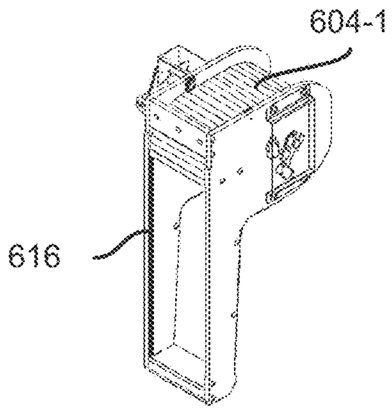

FIGS. 6A and 6B depict another example door unit 600, including six doors, 604-1, 604-2, 604-3, 604-4, 604-5, and 604-6 supported in a frame 602. The doors 604 are tambour-style doors and include a plurality of tambour panels 608 interconnected with each other to avow the doors 604 to bend around corners and the like. For example, the tambour panels 608 may be connected via tongue-in-groove connections or other suitable types of connections to allow for flexibility in the doors 604 via rotation of the tambour panels 608 relative to one another.

Figure 6D:
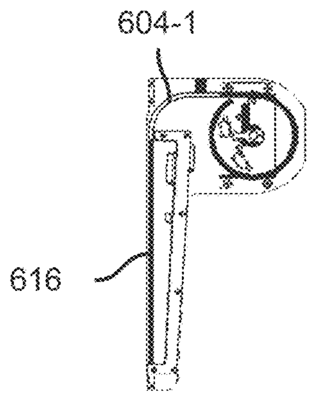

In particular, the doors 604 are configured to move vertically, with each door 604 moving independent of each other. That is, the free edges 612 of the doors are configured to move parallel to a plane of the front plate 112, in a vertical direction. For example, FIG. 6B depicts the doors 604-1 and 604-4 in the open position. In the open position, the free edges 612-1 and 612-4 are spaced away from the frame 602 of the door unit 600. The doors 604 may be situated on respective tracks 616 as shown in FIGS. 60 and 6D and may be driven by one or more motors, drive belts, pulleys, and the like. In the present example, the tracks 616 roll in a space above the aperture 108. Accordingly, the doors 604 and/or the door unit 600 may have a sufficient depth to accommodate the space to roll the tambour-style doors 604 within the enclosure 104.

In particular, each door 604 may have its own track 616 and may be driven independently. Accordingly, the frame 602 may include a portion between each of the doors 604 to seal any gaps between the doors 604. Each of the doors 604 has a predefined width, and accordingly, each door 604 limits the accessible portion of the aperture 108 along a width of the aperture 108. Further, the doors 604 may be configured to open to a certain height, thereby limiting the accessible portion of the aperture 108 along a height of the aperture. For example, the door 604-1 is opened substantially along an entire height of the aperture 108 to allow access to a taller item 620-1, while the door 604-4 is opened to about half a height of the aperture 108 to allow access to a shorter item 620-2. The shelf units 204 may therefore include vertical separators 212 between each door 604, as well as optional horizontal separators 212 as appropriate based on the items to be stored on the shelf units 204.

Figure 7A:
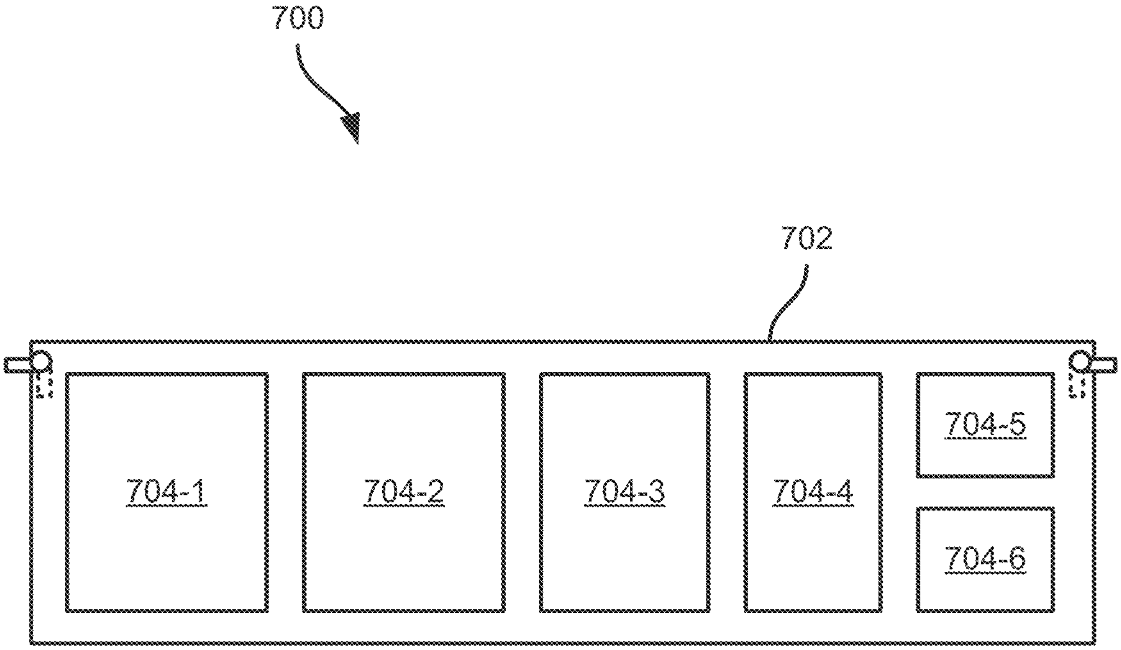
FIGS. 7A and 7B depict an example door unit with hinged doors.
Figure 7B:
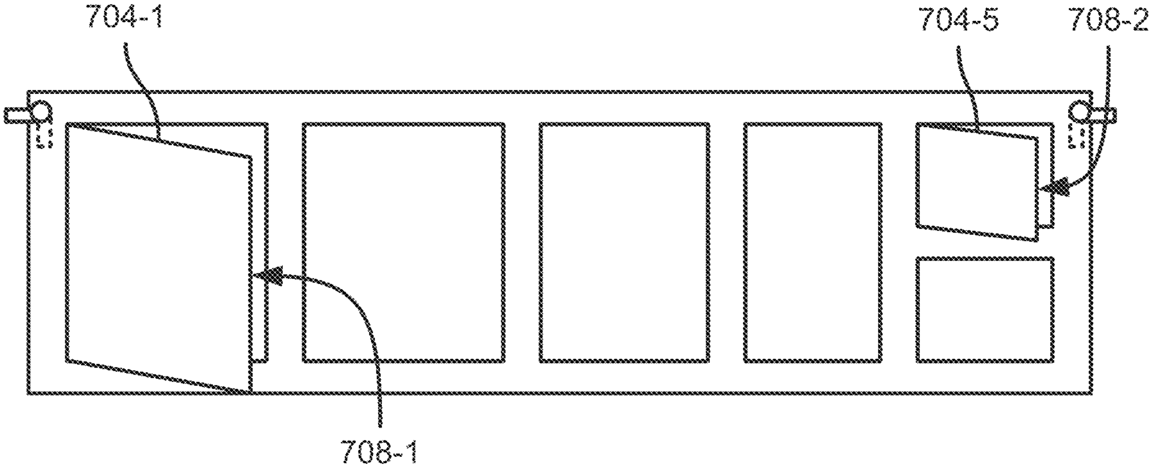

FIGS. 7A and 7B depict another example door unit 700, including six doors, 704-1, 704-2, 704-3, 704-4, 704-5, and 704-6 supported in a frame 702. The doors 704 are hinged doors, and accordingly may include a single panel. The doors 704 may be configured to rotate about a hinged edge to allow the opposing free edge 708 (e.g., the free edges 708-1 and 708-5 of the doors 704-1 and 704-2, respectively) to swing open to allow access to the corresponding portion of the aperture 108 when the door 704 is in the open position. Accordingly, the doors 704 may include one or more hinges, latches, shafts, strikers, and the like, to allow the doors 704 to move between the open position and the closed position.

The doors 704 may have a predefined width, and accordingly, each door 704 limits the aperture 108 along a width of the aperture 108. The doors 704 further have a predefined height, and accordingly, each door 704 may limit the aperture 108 along a height of the aperture 108, For example, the door 704-5 is about half the height of the aperture 108. The shelving units 204 may therefore include suitable vertical separators 212 aligned between each of the doors 704 as well as horizontal separators 212 configured to support items on an upper level in a region of the shelf unit 204 corresponding to the door 704-5.

In other examples, other suitable door units including other door configurations are also contemplated. For example, a door unit may include a plurality of stacked horizontally sliding doors, each having a track at a different depth to allow for flexibility in making portions of the aperture 108 accessible. Preferably, the above-described door units 300, 400, 500, 600, 700 and other suitable door units may be constructed to be interchangeable in the asset management device 100. Accordingly, the asset management device 100 may be configured with a suitable door unit according to a size and type of the items to be stored therein and/or dispensed therefrom.

Figure 8:
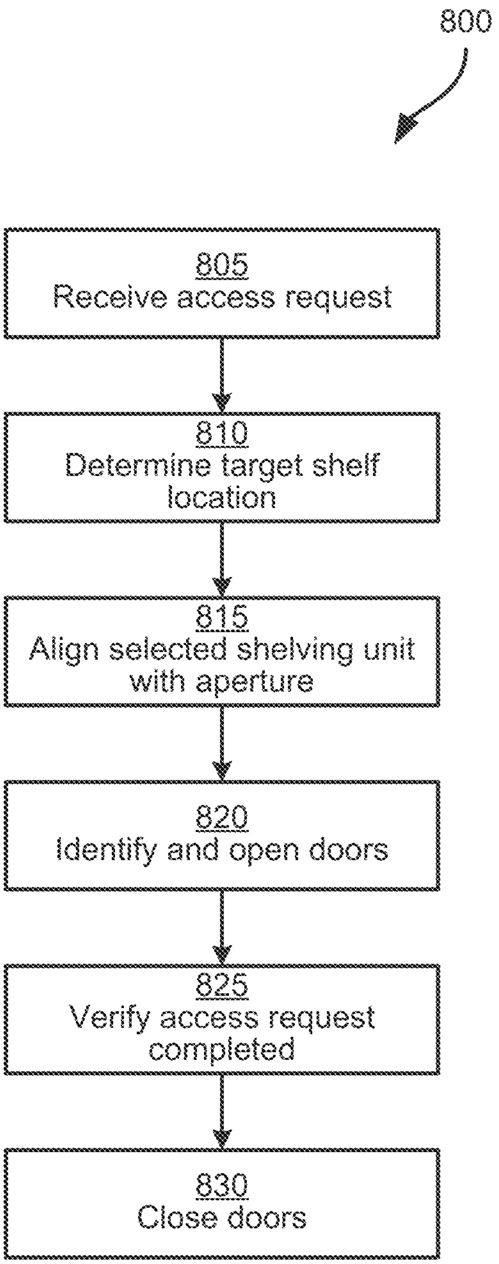
FIG. 8 depicts a flowchart of an example method of managing an asset management device in accordance with the present disclosure.

Turning now to FIG. 8, the functionality implemented by the device 100 will be discussed in greater detail. FIG. 8 illustrates a flowchart of an example method 800 of managing an asset management device. The method 800 will be discussed in conjunction with its performance in the device 100. In other examples, the method 800 may be performed by other suitable devices and/or systems.

At block 805, the device 100 receives an access request, for example via input from the user interface 128. The access request may be, for example, a storage request to store an item in the device 100, or a dispensing request to obtain an item dispensed from the device 100. Other types of access requests are also contemplated. The access request may be accompanied by a verification request, for example to verify the identity of the user making the access request, to associate the access request to a particular user account, and the like.

The storage request may include dimensions of the item to be stored, to allow the device 100 to identify a suitable shelf location to store the item. The storage request may additionally include an item identifier (e.g., by scanning a barcode or the like) to further facilitate subsequent recognition of the item. Preferably, identification of the item may be automatic, for example using computer vision techniques based on image and/or video data captured by cameras associated with the enclosure 104, by an embedded barcode reader or radio frequency identification (RFD) reader, or the like. In particular, identification of the item may occur when the item is placed in a designated location, such as a support surface in front of the aperture 108 or the like.

The dispensing request may include an item identifier to identify the item and/or items to be dispensed. Alternately, if a user is retrieving a previously stored item, the item and/or item location may be inferred from the user account. If the item requested for dispensation is a protected item (e.g., requiring certain levels of clearance, etc.), then the device 100 may verity security clearance based on the verification request results, and/or may request further authentication.

At block 810, in response to the access request, the device 100, and in particular, the controller 124, is configured to determine a target shelf location for the access request. The target shelf location may include a shelf identifier identifying a particular shelving unit 204 of the plurality of shelving units, as well as a region or region(s) within the shelving unit 204, for example as designated by the separators 212, or based on accessibility based on the type of doors 120.

When the access request is a storage request, the target shelf location may be a vacant location for storing the item identified in the access request. In particular, the vacant location may be capable of accommodating the item based on the dimensions of the item. When the access request is a dispensing request, the target shelf location may be the location of the item identified in the access request.

At block 815, the device 100, and in particular, the controller 124, is configured to drive the carousel 200 until the selected shelving unit 204 identified at block 810 is aligned with the aperture 108. The carousel 200 may preferably be rotated either clockwise or counterclockwise according to the location of the selected shelving unit 204 prior to rotation to minimize the overall movement of the carousel 200.

At block 820, the device 100, an in particular, the controller 124, is configured to identify doors 120 of the door unit 116 which correspond to the region(s) of the shelving unit 204 identified as being the target shelf location. The device 100 may then enable the identified door(s) to move to the open position to allow access to the region of the shelving unit through an accessible portion of the aperture 108 (i.e., the portion of the aperture 108 corresponding to the one or more doors 120).

For example, the device 100 may first disengage the door locks for the corresponding doors 120. Further, if the doors 120 are capable of being controlled (e.g., the plate-style doors 304, the tambour-style doors 404, etc.), then the device 100 may control the corresponding doors 120 to move to the open position. In other examples, the device 100 may simply output an indication that the doors 120 are capable of being moved to the open position, for example by manual interaction from the user. The indication may be, for example, a light associated with the corresponding door(s) 120 to be opened. In some examples, in response to the door 120 being moved to the open position, the device 100 may turn on a light to visually aid in the storage or retrieval of the item.

At block 825, the device 100 verifies completion of the access request. For example, the device 100 may verify that that the item was received into or removed from the target shelf location, using one or more of the cameras associated with the enclosure. In some examples, the device 100 may include sets of cameras both on the interior and exterior of the enclosure 104, which may be cross-referenced to verify the location of the item (i.e., removed from the target shelf location, partially enclosed in/removed from the target shelf location, entirely enclosed in the target shelf location).

In some examples, additionally or alternatively, the item identification may be performed by the device 100 after the item is received in the target shelf location in context of a storage request. Thus, for example, the barcode and/or RFID readers and/or cameras may be disposed within the enclosure 104 to identify items which are on the shelving unit 204 which is aligned with the aperture 108. In other examples, each shelving unit 204 may have dedicated item identification mechanisms.

In some examples, if the access request has not been completed after a predetermined amount of time, then the device 100 may identify an error condition and may output an error notification. For example, the error notification may include a visual or audio indicator at the device 100, for example emitted via the user interface 128. The error notification may additionally include an error message sent to an administrator of the device 100.

At block 830, after the access request has been completed or when the access request times out, the device 100, and in particular, the controller 124, is configured to close the door(s) 120 and re-engage the door locks as applicable.

As described herein, an asset management device or shelving system includes a vertical carousel supporting a plurality of shelving units. A selected shelving unit may be aligned with an aperture on an enclosure of the asset management device. A door unit, which is preferably removably secured in the aperture, may be controlled to selectively open a door on the door unit to allow access through a portion of the aperture (i.e., an accessible portion of the aperture corresponding with the area of the open door). The doors provided in the door unit may preferably be configured to be substantially modular or otherwise flexibly able to change the accessible portion of the aperture, for example to store and/or retrieve larger items. For example, multiple doors may be opened simultaneously to act as a single larger door. Further, the doors may preferably open by having a free edge of the door move parallel to a plane of the front plate of the enclosure. This may conserve space required when the doors are moved to the open position.

The scope of the claims should not be limited by the embodiments set forth in the above examples but should be given the broadest interpretation consistent with the description as a whole.

The invention claimed is:

1. An asset management device comprising:

an enclosure having an aperture extending across a front plate of the enclosure;

a plurality of shelving units;

a vertical carousel disposed within the enclosure to support the plurality of shelving units, the vertical carousel having at least one horizontal axis of rotation and configured to rotate about the at least one horizontal axis of rotation to move the shelving units vertically within the enclosure until a selected shelving unit is aligned with the aperture; and a door unit removably secured in the aperture, the door unit comprising:

a locking element configured to secure the door unit in the aperture; and a plurality of doors, each door comprising tambour panels, wherein a free edge of each door is configured to move vertically along the plane of the front plate of the enclosure to move the door between an open position and a closed position, the open position configured to allow access through a portion of the aperture to a corresponding region of the selected shelving unit and the closed position configured to restrict access through the portion of the aperture, and wherein an opposing edge of the door is configured to move along a track.

2. The asset management device of claim 1, wherein each door is configured to limit the portion along a width of the aperture.

3. The asset management device of claim 2, wherein at least one door is further configured to limit the portion along a height of the aperture.

4. The asset management device of claim 1, wherein the shelving units further comprise separators configured to separate regions of the shelving units.

5. The asset management device of claim 4, wherein the separators include one or more vertical separators.

6. The asset management device of claim 1, wherein each door further comprises a door lock configured to maintain the door in the closed position when the door lock is engaged.

7. The asset management device of claim 1, further comprising a controller interconnected with the carousel and the door unit, wherein the controller is configured to control the carousel to align the selected shelving unit with the aperture and move a selected door to the open position based on an access request.

* * * * *